(12) United States Patent
Sudo (10) Patent No.: US 10,848,674 B2
(45) Date of Patent: Nov. 24, 2020

(54) IMAGE STABILIZATION DEVICE, LENS UNIT OR IMAGING DEVICE INCLUDING THE SAME, AND IMAGE STABILIZATION METHOD

(71) Applicant: TAMRON CO., LTD., Saitama (JP)

(72) Inventor: Eiri Sudo, Saitama (JP)

(73) Assignee: TAMRON CO., LTD., Saitama (JP)

( * ) Notice: Subject to any disclaimer, the term of this patent is extended or adjusted under 35 U.S.C. 154(b) by 0 days.

(21) Appl. No.: 16/522,007

(22) Filed: Jul. 25, 2019

(65) Prior Publication Data

US 2020/0077024 A1    Mar. 5, 2020

(30) Foreign Application Priority Data

Aug. 30, 2018   (JP) .................................. 2018-161739

(51) Int. Cl.
*H04N 5/232*    (2006.01)
*H04N 5/14*    (2006.01)

(52) U.S. Cl.
CPC ..... *H04N 5/23267* (2013.01); *H04N 5/23287* (2013.01); *H04N 5/145* (2013.01); *H04N 5/23254* (2013.01)

(58) Field of Classification Search
CPC . H04N 5/23254; H04N 5/23248–2329; G02B 27/646; G03B 2205/0007–0038
USPC .... 348/208.1, 208.99, 208.4, 208.2; 396/54; 359/554–557
See application file for complete search history.

(56) References Cited

U.S. PATENT DOCUMENTS

| | | | | |
|---|---|---|---|---|
| 8,493,454 | B1 * | 7/2013 | Kohn | H04N 5/23258 348/208.2 |
| 2007/0242936 | A1 * | 10/2007 | Chujo | G03B 17/00 396/55 |
| 2013/0044229 | A1 * | 2/2013 | Noguchi | H04N 5/2328 348/208.6 |
| 2015/0241759 | A1 * | 8/2015 | Sasaki | G03B 5/02 359/703 |
| 2016/0353027 | A1 * | 12/2016 | Yoo | H04N 5/23267 |

FOREIGN PATENT DOCUMENTS

JP    2017-044876 A    3/2017

* cited by examiner

*Primary Examiner* — Xi Wang
(74) *Attorney, Agent, or Firm* — Paratus Law Group, PLLC (57) ABSTRACT

The present invention relates to an image stabilization device for correcting an image shake formed on an image face of an imaging device, and the image stabilization device includes a shake angle sensor configured to detect a shake angle of the imaging device, a correction amount calculation unit configured to set a movement amount of an image stabilization lens composing a part of an imaging optical system provided in the imaging device or a movement amount of the imaging face based on the shake angle detected by the shake angle sensor so that the image shake formed on the imaging face is suppressed, and an actuator configured to move the image stabilization lens or the imaging face by the movement amount set by the correction amount calculation unit in a plane orthogonal to an optical axis of the imaging device.

9 Claims, 6 Drawing Sheets

| DIVISION POSITION | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| VERTICAL IMAGE SHAKE AMOUNT | 0.1257 | 0.1260 | 0.1270 | 0.1286 | 0.1308 | 0.1337 | 0.1372 | 0.1413 | 0.1461 | 0.1515 | 0.1575 |
| HORIZONTAL IMAGE SHAKE AMOUNT | 0.1257 | 0.1264 | 0.1286 | 0.1322 | 0.1372 | 0.1436 | 0.1515 | 0.1607 | 0.1714 | 0.1836 | 0.1971 |

IMAGE STABILIZATION DEVICE, LENS UNIT OR IMAGING DEVICE INCLUDING THE SAME, AND IMAGE STABILIZATION METHOD

CROSS-REFERENCE TO RELATED APPLICATIONS

This application is based on and claims the benefit of priority from Japanese Patent Application No. 2018-161739, filed on Aug. 30, 2018, the entire contents of which are incorporated herein by reference.

BACKGROUND OF THE INVENTION

Technical Field

The present invention relates to an image stabilization device, and in particular, an image stabilization device for correcting an image shake formed on an imaging face of an imaging device, a lens unit or the imaging device including the image stabilization device, and an image stabilization method.

Related Art

In recent years, an imaging device having a function of image stabilization is widely used, in which a shake of the imaging device is detected and a lens or the imaging sensor of a part of an optic system is moved based on a detected shake angle to correct an image shake formed on an imaging sensor. JP 2017-44876 A. (Patent Document 1) describes an imaging device and an image stabilization method. In this image stabilization method, a correction coefficient for an image shake amount is calculated based on information of a projection method and focal length in an optical system and information of a specific image point position corresponding to a focusing area of the optical system. Furthermore, the image shake is corrected by moving the imaging sensor in a plane orthogonal to an optical axis of the optical system based on the image shake amount corrected using the calculated correction coefficient.

When the imaging device is shaken, the image formed on the imaging face of the imaging sensor is shaken, and the image shake can be corrected by moving the imaging sensor by the shake amount or moving a part of lenses of the imaging optical system so as to cancel the image shake on the imaging face. Since the shake amount of the image on the imaging face, which is generated when the imaging device is shaken, varies depending on a focal length of the imaging optical system, the imaging device described in JP 2017-44876 A acquires focal distance information and sets a shake correction amount.

However, for example, when the projection method of the imaging optical system is a central projection method used in a general optical system, the shake amount of the image on the imaging face caused by the shake of the imaging device varies depending on a position on the imaging face. Therefore, for example, even if the imaging sensor is moved to correct the image shake caused in the central part of the imaging face, since the image shake amount is different in a peripheral area of the imaging face, there may be a problem that the image shake remains in the peripheral area when the shake in the central part is corrected. This problem has become significant in recent years as the shake correction function is incorporated into an imaging optical system with a short focal length, with improved performance of the shake correction function.

In order to solve this problem, in the imaging device described in JP 2017-44876 A, while obtaining information of the projection method of the optical system, for example, information of the image point position corresponding to the focusing area is also obtained and the movement amount of the image sensor is set so that the image shake amount becomes small in the focusing area. When the movement amount of the imaging sensor is set in this manner, the image shake at a focusing area in the obtained image can be effectively suppressed. With this configuration, in the imaging device described in JP 2017-44876 A, the camera shake correction function can be operated such that the difference in the image shake within the angle of view caused by the projection method of the optical system is not too noticeable.

However, in the imaging device described in JP 2017-44876 A, since the image shake of a specific part (for example, the focusing area) in the formed image is corrected, there is a problem that a large image shake may remain in other parts, and this may give an impression that the image has shaking overall. In a same manner, in the imaging device described in JP 2017-44876 A, although it is possible to correct an image shake on an area where there is a specific object including a face of a person or on a golden division line, a large image shake remains in other parts as a result. Also, there may be a problem that, when the imaging device is moved after a position of the specific object whose image shake should be corrected within the angle of view, the image shake at a position different from that of the specific object is corrected but the image shake of the specific object is not sufficiently corrected.

In addition, when the image stabilization method described in JP 2017-44876 A is applied to shooting of a moving image, so-called "konnyaku phenomenon" may occur in which the image shake is suppressed in the focusing area in the angle of view but the image in a peripheral are sways and this may cause an unsightly moving image. This is particularly caused by that the correction amount required to correct the image shake largely differs within the angle of view when shooting is performed with a wide-angle lens, and an amount of remained shaking on the image varies according to a distance from the image shake corrected position. It is generally understood that this "konnyaku phenomenon" is caused by so-called "rolling shutter distortion" caused by a time difference in readout of image information in a CMOS sensor of the imaging device. However, it has been found by the inventor of the present invention that the cause of the so-called "konnyaku phenomenon" includes an image in addition to the "rolling shutter distortion" and succeeded an suppressing occurrence of the "konnyaku phenomenon."

Therefore, the present invention has an object to provide an image stabilization device capable of operating a shake correction function so that a difference in an image shake within an angle of view becomes unnoticeable, a lens unit or an imaging device including with the image stabilization device, and an image stabilization method.

SUMMARY OF THE INVENTION

In order to solve the above described problem, the present invention provides an image stabilization device for correcting an image shake formed on an imaging face of an imaging device, and the image stabilization device includes a shake angle sensor configured to detect a shake angle of the imaging device, a correction amount calculation unit configured to set a movement amount of an image stabilization lens composing a part of an imaging optical system provided in the imaging device or a movement amount of the imaging face based on the shake angle detected by the shake angle sensor to suppress the image shake formed on the image face, and an actuator configured to move the image stabilization lens or the imaging face by the movement amount set by the correction amount calculation unit in a plane orthogonal to an optical axis of the imaging device, in which the correction amount calculation unit determines the movement amount to suppress the image shake amount at each point on overall on the imaging face.

According to the present invention having the above described configuration, since the movement amount of the image stabilization lens or the imaging face is determined to suppress the image shake amount at each point on the imaging face overall on the imaging surface, an image can be formed to give an impression with less image shake with unnoticeable difference in image shake within the angle of view.

Further, the present invention provides a lens unit including the image stabilization device according to the present invention and the lens unit includes a lens barrel, an imaging lens provided inside the lens barrel, and an actuator for driving the image stabilization lens in a plane orthogonal to an optical axis.

Furthermore, the present invention provides an imaging device provided with the image stabilization device according to the present invention, and the imaging device includes an imaging device body, an imaging sensor provided inside the imaging device body and having an imaging face, and an actuator configured to drive the imaging sensor in a plane orthogonal to an optical axis.

Further, the present invention provides an image stabilization method for correcting an image shake formed on an image face of an imaging device, and the method includes a detection step of detecting a shake angle of the imaging device, a movement amount setting step of setting a movement amount of the an image stabilization lens composing a part of an imaging optical system provided in the imaging device or a movement amount of the imaging face on the detected shake angle to suppress the shake of the image formed on the imaging face based on the detected shake angle, and a moving step of moving the image stabilization lens or the imaging face by the set movement amount in a plane orthogonal to an optical axis of the imaging device. In the movement amount setting step, the movement amount is determined to suppress the image shake amount at each point on the imaging face overall on the entire imaging face.

According to the image stabilization device according to the present invention, the lens unit or imaging device including the image stabilization device, and the image stabilization method, the image stabilization function can be operated to make the difference in the image shake within the angle of view unnoticeable.

DESCRIPTION OF THE EMBODIMENTS

Figure 1:
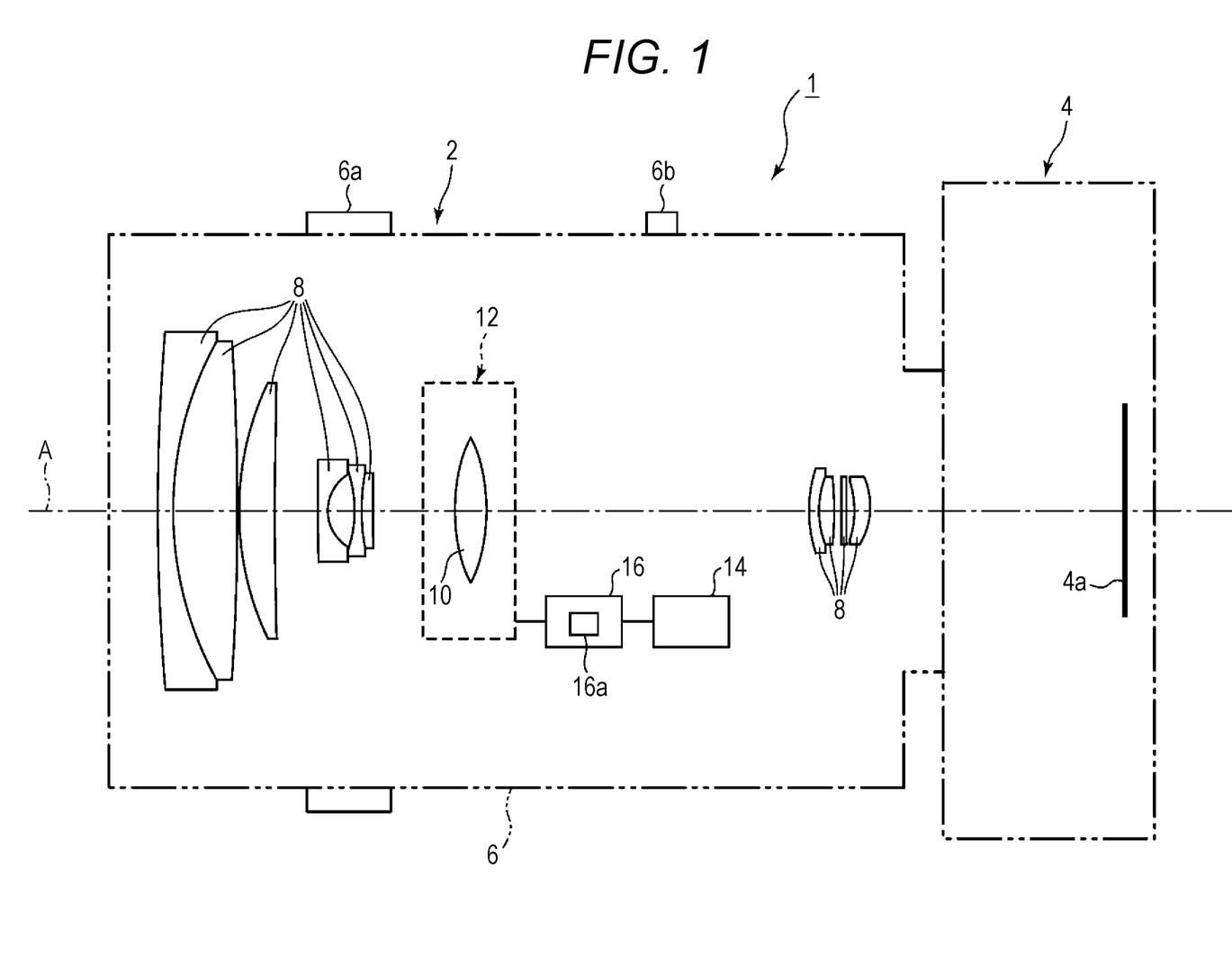
FIG. 1 is a cross-sectional diagram of a camera according to an embodiment of the present invention.

An embodiment of the present invention will be described with reference to the accompanying drawings. First, a camera according to the embodiment of the present invention will be described with reference to FIGS. 1 to 6. FIG. 1 is a cross-sectional diagram of a camera according to the embodiment of the present invention.

<Configuration of Camera>

As illustrated in FIG. 1, a camera 1, which is an imaging device according to the embodiment of the present invention, has a lens unit 2 and a camera body 4 which is an imaging device main body. The lens unit 2 includes a lens barrel 6, a plurality of lenses 8 provided in the lens barrel 6, and an image stabilization actuator 12 that moves an image stabilization lens 10 of the lenses in a plane orthogonal to an optic axis A. Further, the lens unit 2 includes a gyro sensor 14 that is a shake angle sensor to detect a shake of the lens barrel 6, and a lens control unit 16 that operates the actuator 12 based on a detection signal from the gyro sensor 14.

The camera 1 according to the embodiment of the present invention detects a shake angle of the camera 1 (the lens barrel 6) using the gyro sensor 14 and operates the actuator 12 based on the detected shake angle to move the image stabilization lens 10, and the image is moved to stabilize the image formed on the imaging sensor 4a in the camera body 4.

The lens unit 2 is attached to the camera body 4 so that incident light forms an image on an imaging face on a surface of the imaging sensor 4a. The substantially cylindrical lens barrel 6 holds the plurality of lenses 8 inside, and enables focus adjustment by moving some of the lenses 8 in the direction of the optical axis A. In addition, a part of the lens 8 is provided as a lens for adjusting an angle of view, and the focal length of the lens unit 2 is changed by operating a zoom ring 6a provided near the lens barrel 6. These lenses 8 provided in the lens unit 2 constitute an imaging optical system of the imaging device.

Further, a part of the lenses disposed in the lens unit 2 is provided as the image stabilization lens 10. When the image stabilization lens 10 is moved in a plane orthogonal to the optical axis A by the actuator 12, an image shake formed on the imaging face of the imaging sensor 4a is suppressed. Further, according to the present embodiment, the image stabilization lens 10, which is a part of the imaging lens, is constituted by a single lens, but the lens for stabilizing the image may be a lens group. In the present specification, the image stabilization lens may include a single lens and a lens group for stabilizing an image.

The actuator 12 is configured to move the image stabilization lens 10 in a plane orthogonal to the optic axis A based on a control signal input from the lens control unit 16. For example, the actuator 12 may be configured so that the image stabilization lens 10 is attached to a movable portion (not illustrated) of the actuator 12 and this movable portion is moved to a predetermined position by a driving force of a plurality of voice coil motors (not illustrated).

The gyro sensor 14 is provided in the lens barrel 6 and is configured to detect a shake angular velocity in a yaw direction and a pitch direction of the camera 1. Here, according to the present embodiment, a piezoelectric vibration gyro sensor is used as the gyro sensor 14; however, any sensor that measures shake angle acceleration or shake acceleration can be used as a shake angle sensor.

The lens control unit 16 is configured to control the actuator 12 based on a detection signal from the gyro sensor 14 to move the image stabilization lens 10. More specifically, the lens control unit 16 may be configured by a microprocessor, a memory, a program for operating those, an interface circuit, an A/D converter (which are not illustrated), and the like. The shake angular velocity detected by the gyro sensor 14 is integrated in the lens control unit 16 to calculate the shake angle in the yaw direction and the pitch direction. A correction amount calculation unit 16a built in the lens control unit 16 calculates a movement amount to move the image stabilization lens 10 based on the calculated shake angle in each direction and outputs a control signal to the actuator 12 based on the calculated movement amount.

In addition, the lens control unit 16 is configured to be able to execute a plurality of correction modes, and a user can select a desired correction mode from the plurality of correction modes by operating a correction mode selection switch 6b provided to the lens barrel 6. Although a configuration in which the correction mode selection switch 6b is provided in the lens barrel 6 will be described as an example here, the present invention is not limited to this example. For example, there may be a configuration in which a screen for selecting a correction mode may be displayed on a display of the camera body 4 as the correction mode selection switch 6b to accept user's operation for selecting a desired correction mode.

As described above, according to the present embodiment, the gyro sensor 14, the lens control unit 16 (the correction amount calculation unit 16a), and the actuator 12 built in the lens unit 2 serve as the image stabilization device for correcting the image shake formed on the imaging face. Further, details of control of the actuator 12 by the lens control unit 16 will be described later.

<Operation of Image Stabilization Device and Image Stabilization Method>

Next, with reference to FIG. 2, the operation of the image stabilization device and an image stabilization method according to the embodiment of the present invention will be described.

Figure 2:
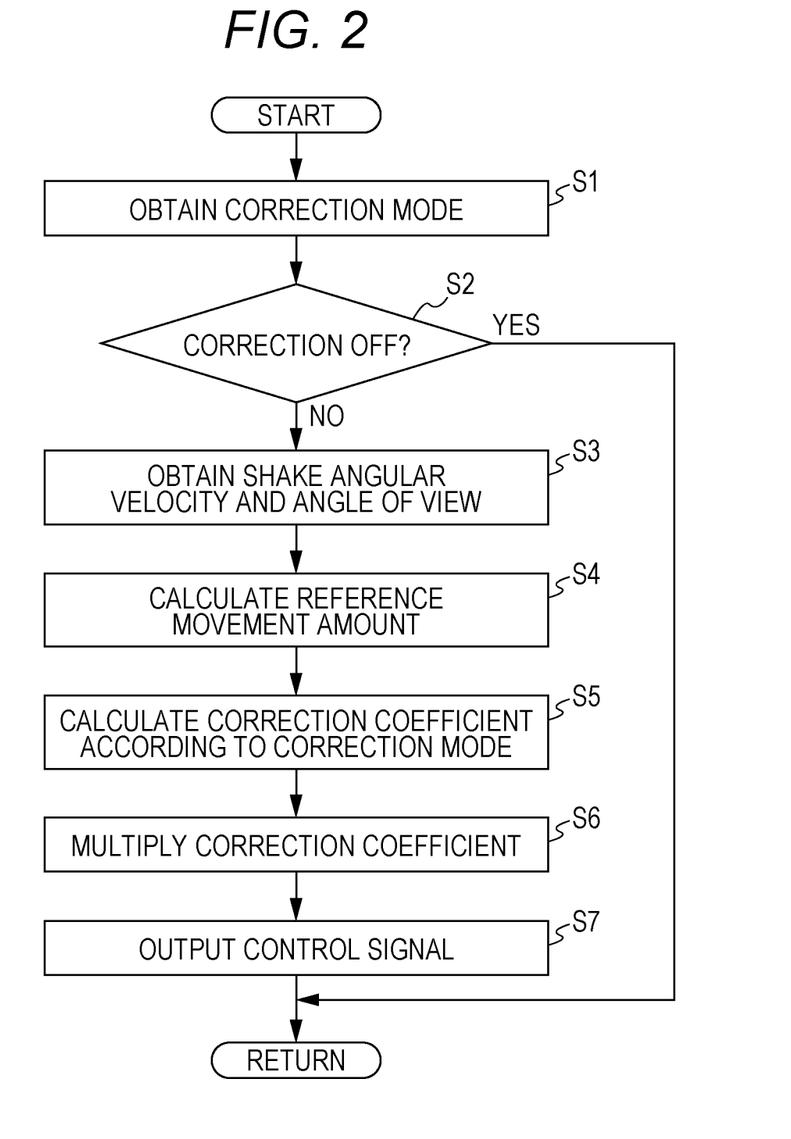
FIG. 2 is a flowchart illustrating an image stabilization method according to the embodiment of the present invention.

FIG. 2 is a flowchart illustrating an image stabilization method according to the embodiment of the present invention, and processes according to this flowchart is repeatedly executed at predetermined time intervals in the lens control unit 16 mounted in the lens unit 2.

First, in step S1 in FIG. 2, the lens control unit 16 acquires a setting state of an image stabilization mode (a correction mode) by the correction mode selection switch 6b provided in the lens barrel 6. According to the present embodiment, execution or non-execution of image stabilization by the image stabilization device can be switched by setting of the correction mode selection switch 6b and, in addition, three types of image stabilization modes can be switched according to a photographing condition or user's preference. However, it is sufficient when at least one type of the image stabilization mode is provided, and the present invention may be configured such that execution and non-execution of correction and the type of image stabilization mode to be executed can be switched automatically. Details of each correction mode will be described later.

Next, in step S2, as the lens control unit 16 determines whether the execution of the image stabilization is selected by the correction mode selection switch 6b, it is determined whether the correction is OFF. In other words, when one of the three types of image stabilization modes is selected by the correction mode selection switch 6b (NO in step S2), the lens control unit 16 proceeds to step S3, and when image stabilization set to non-execution (OFF) (YES in step S2), a cycle of the processes of the flowchart illustrated in FIG. 2 is ended.

Next, in step S3, as a detection step, the shake angular velocity [deg/sec] of the camera 1 detected by the gyro sensor 14 and the angle of view set by the zoom ring 6a (focal length of imaging optical system [mm]) is read by the lens control unit 16. In other words, the gyro sensor 14 mounted in the lens unit 2 detects the shake angular velocity in the yaw direction and the pitch direction of the camera 1, and these detection signals are obtained by the lens control unit 16. Furthermore, each obtained shake angular velocity is integrated with time, and a shake angle [deg] in the yaw direction and a shake angle [deg] in the pitch direction are respectively calculated. Note that the shake angle in the yaw direction represents a rotation angle about a perpendicular axis passing through the imaging face, and the shake angle in the pitch direction represents a rotation angle about a horizontal axis passing through the imaging face.

Further, a set position of the angle of view by the zoom ring 6a is detected by a rotary encoder (not illustrated) mounted in the lens unit 2, and this detection signal is obtained by the lens control unit 16. Further, based on the detection signal of the angle of view input to the lens control unit 16, a microprocessor (not illustrated) of the lens control unit 16 calculates the focal length f of the imaging optical system.

Next, in step S4, a reference movement amount needed to suppress the image shake formed on the imaging face of the imaging sensor 4a by the imaging optical system of the lens unit 2 is calculated. Here, when the camera 1 is shaken by $\Delta\theta$ [deg] in the direction of $\psi$ [deg] from a center of the imaging face, regarding the image formed on the imaging face of the imaging sensor 4a, the shake of the imaging face in the perpendicular direction at a center point is calculated as $$\Delta hv = f \tan \Delta\theta \cdot \sin \psi [\text{mm}] \quad (1),$$

and the shake in the horizontal direction is calculated as $$\Delta hh = f \tan \Delta\theta \cdot \cos \psi [\text{mm}] \quad (2)$$

Here, f [mm] represents a 35-mm equivalent focal length.

For example, when the camera 1 is shaken by $\Delta\theta=1$ [deg] from the center in the direction of $\psi=30$ [deg] in a condition of the 35-mm equivalent focal length f=24 [mm], regarding the center point of the imaging face (a point where the optical axis A passes through), the image shake in the perpendicular direction is calculated as 0.210 [mm] and the image shake of the horizontal direction is calculated to be 0.363 [mm]. Therefore, when the camera 1 is shaken as described above, the image stabilization lens 10 is moved so that the image formed on the imaging face by 0.210 [mm] in the perpendicular direction and by 0.363 [mm] in the horizontal direction so that the image shake formed on the imaging face can be canceled and the image shake can be suppressed. In other words, using the above equations (1) and (2), the perpendicular and horizontal reference movement amounts [mm] needed to cancel the image shake at the center point of the imaging face can be calculated, respectively.

Here, according to the present embodiment, the image stabilization lens 10 is moved in a plane orthogonal to the optical axis A to correct the image shake formed on the imaging face. However, as a modification, the present invention can also be applied to an image stabilization device of a type in which the imaging sensor 4a is moved in a plane orthogonal to the optical axis A without using an image stabilization lens. In this case, in the above example, the image shake formed on the imaging face can be suppressed by moving the imaging sensor 4a itself by 0.210 [mm] in the perpendicular direction and by 0.363 [mm] in the horizontal direction.

Next, in step S5, as a movement, amount setting step, the correction amount calculation unit 16a calculates a correction coefficient according to the correction mode selected (set) by the correction mode selection switch 6b. As described above, when the camera 1 is shaken by a predetermined angle in a predetermined direction, the image to be formed is moved in the opposite direction by the reference movement amount calculated by the equations (1) and (2) by moving the image stabilization lens 10, so that the image shake at the central point of the imaging face can be suppressed.

However, when the imaging optical system of the lens unit 2 is a central projection method used in a general imaging optical system, the shake amount generated when the camera 1 is shaken by a predetermined angle becomes different values at each part on the imaging face. Therefore, when the image stabilization lens 10 is moved so that the image moves by the calculated reference movement amount, even if the image shake at the center point of the imaging face can be sufficiently suppressed, the image shake may remain at points other than the center point and an impression that the entire image has shaking may be given.

Here, the shake amount Δhd generated at each point on the imaging face can be calculated by the following equation.

$$\Delta hd = f \times (\tan(\beta + \Delta\theta) - \tan\beta) \quad (3)$$

where $\beta = \alpha \times d$,
$\alpha = \tan^{-1}(D/(2 \times f))$

In the above equation, f represents a focal length [mm], Δθ represents a shake angle of the camera 1 [deg], D represents a sensor size (length of one side of the imaging face of the imaging sensor 4a) [mm], d represents a value obtained by dividing a distance from the center point to a point at which the shake amount Δhd is calculated by (D/2). Such a difference in shake amounts of the respective parts on the imaging face becomes particularly remarkable in a wide-angle (large angle of view) imaging optical system having a short focal length f.

Figure 3:
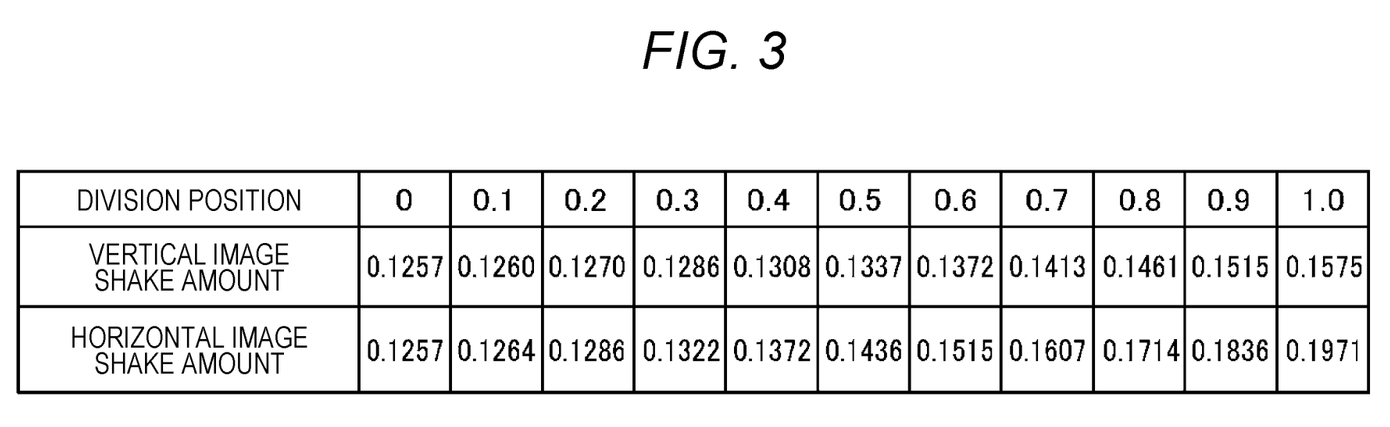
FIG. 3 is a diagram illustrating an example in which a shake amount generated at each point on the imaging face is calculated when the camera is shaken at a certain angle.

FIG. 3 is a diagram illustrating an example of calculating a shake amount Δhd [mm] generated at each point on the imaging face by the equation (3) when the camera 1 is shaken at a certain angle Δθ [deg] in a predetermined direction. In FIG. 3, the division position "0" indicates the shake amount of the image in the perpendicular (vertical) direction and the horizontal direction at the central point of the imaging face (the point where the optical axis A passes, that is, a point where d=0). In the example illustrated in FIG. 3, an image shake of 0.1257 [mm] in the vertical direction and 0.1257 [mm] in the horizontal direction occurs at the center point of the imaging face.

On the other hand, the division position "1" in FIG. 3 indicates an image shake amount in a point at the upper end of the imaging face (a point where d=1, where D is the height of the imaging face), and a right end point (a point where d=1, where D is the width of the imaging face). In other words, in the example illustrated in FIG. 3, an image shake is generated respectively at 0.1575 [mm] in the vertical direction (perpendicular direction) at the upper end point of the imaging face and at 0.1971 [mm] in the horizontal direction at the right end point of the imaging face. Furthermore, the division positions "0.1" to "0.9" in FIG. 3 respectively indicate shake amounts in the vertical direction and horizontal direction at each point obtained by dividing the imaging face from the center to the upper end by 10 (each point where d=0.1 to 0.9). In addition, the shake amount generated at each point on the imaging face is symmetrical in the vertical and horizontal directions with respect to the horizontal central axis and the vertical central axis. Therefore, the shake amount at the upper end point of the imaging face is equal to the shake amount at the lower end point of the imaging face, and the shake amount at the right end point of the imaging face is equal to the shake amount at the left end of the imaging face.

As illustrated in FIG. 3, when the camera 1 is shaken in a certain direction at a certain angle, the shake amount generated at each point on the imaging face becomes different values. In a conventional shake correction device, for example, the imaging sensor 4a is moved by a reference movement amount (0.1257 [mm] in both the vertical direction and the horizontal direction in the example of FIG. 3) so that a shake generated at the center point of the imaging face is cancelled or the image stabilization lens 10 is moved such that an image formed on the imaging face is moved in an opposite direction by the reference movement amount. By operating the shake correction device in this manner, a shake amount at the center point of the imaging face can be canceled and the shake amount can be made substantially zero.

However, as described above, since the shake amount of the image generated on the imaging surface is different at each point, even if the correction of the reference movement amount is performed, the image shake remains at points other than the center point of the imaging face. In the example illustrated in FIG. 3, at the upper or lower end point of the imaging face, an image shake of 0.1575–0.1257=0.0318 [mm] remains in the vertical (perpendicular) direction, and at the right end or left end point of the imaging face, an image shake of 0.1971–0.1257=0.0714 [mm] remains in the horizontal direction. In addition, at the middle point between the center and the upper end of the imaging face (a point where division position=0.5, d=0.5), the image shake of 0.1337–0.1257=0.0008 [mm] remains in the vertical (perpendicular) direction and, at the midpoint between the center and the right end of the imaging face, an image shake of 0.1436–0.1257=0.0179 [mm] remains in the horizontal direction.

As described above, in the conventional shake correction device, the movement amount of the imaging sensor or the image stabilization lens is determined such that the image shake at a specific point on the imaging face such as the center point is cancelled. Therefore, in the conventional shake correction device, a large shake remains at points other than the specific point used as a reference, and the whole image may give an impression of the image having large image shaking. On the other hand, in the image stabilization device according to the embodiment of the present invention, the correction amount is calculated by the correction amount calculation unit 16a such that the image shake amount at each point on the imaging face of the imaging sensor 4a is suppressed overall on the imaging face. In other words, in the image stabilization device according to the present embodiment, the movement amount is calculated such that the average image shake amount at a plurality of predetermined points on the imaging face is suppressed.

The image stabilization device according to the present embodiment is provided with three types of correction modes: "shake amount minimizing mode," "median minimizing mode," and "allowable shake amount range maximizing mode." In these three correction modes, different calculation algorithms are used respectively to calculate an amount to move the image formed on the imaging face. Even when the movement amount is calculated using any of these calculation algorithms, the average image shake amount at a plurality of points on the imaging face is suppressed, and the image movement amount at each point on the imaging face is suppressed overall as a result.

In step S5, correction coefficients are respectively calculated in the vertical direction and in the horizontal direction based on the image movement amount corresponding to the correction mode selected by the correction mode selection switch 6b. A specific calculation algorithm for calculating the correction coefficient in each correction mode will be described later.

Next, in step S6, the actual movement amount is calculated by multiplying the correction coefficient calculated step S5 with the reference movement amount. In other words, a corrected control parameters are generated by multiplying the correction coefficient calculated in step S5 with a control parameter of the image stabilization lens 10 needed for moving the image formed on the imaging face of the imaging sensor 4a by the reference movement amount in the opposite direction. In addition, the movement amount of the image formed on the imaging face with respect to the movement amount of the image stabilization lens 10 varies according to the focal length of the imaging optical system, and the value of the control parameter is corrected according to the focal length obtained in step S3.

Next, in step S7, as a moving step, a control signal corresponding to the control parameter calculated in step S6 is output from the lens control unit 16 to the actuator 12, and one cycle of the processes of the flowchart illustrated in FIG. 2 ends. Based on the control signal from the lens control unit 16, the image stabilization lens 10 is moved in a plane orthogonal to the optical axis A. The movement amount of the image stabilization lens 10 is corrected with respect to the movement amount for moving the image on the imaging face by the reference movement amount, so that the image shake amount at each point on the imaging face is suppressed overall.

Next, the correction coefficient calculation in step S5 of the flowchart illustrated in FIG. 2 will be specifically described.

<Shake Amount Minimizing Mode>

First, with reference to FIG. 4, the correction coefficient calculation in the "shake amount minimizing mode" will be described. When the "shake amount minimizing mode" is selected by the correction mode selection switch 6b, the image movement amount is determined so that the value obtained by averaging the absolute values of the shake remaining amount in each direction is minimized and the correction coefficient is calculated based on the obtained value. Here, the "shake remaining amount [mm]" represents a "shake amount [mm]" which is expected to remain even after image stabilization is performed by the image stabilization device. More specifically, in the example illustrated in FIG. 3, the shake remaining amounts $R_0$ to $R_{10v}$ [mm] at respective division positions when the image on the imaging face is horizontally moved by the reference movement amount of 0.1257 [mm] is calculated. Here, the shake remaining amount $R_0$ indicates the shake remaining amount at the division position "0", and the shake remaining amounts $R_1$ to $R_{10}$ respectively indicate the shake remaining amount at the division positions "0.1" to "1".

Next, the absolute value of each of the shake remaining amounts $R_0$ to $R_{10}$ is calculated, and the sum thereof is divided by a number of points where the shake remaining amount to is calculated, thereby calculating an average value of the absolute values of the shake remaining amounts. At this time, although there is one center point of the imaging face, there are two division positions "0.1" to "1" on both the left and right sides, so the absolute value of the shake remaining amounts $R_1$ to $R_{10}$ are doubled and then an average value is calculated. Thus, the average value $R_{AV1}$ of the absolute value of the shake remaining amount can be calculated by the following equation.

$$R_{AV1} = \frac{|R_0| + 2\sum_{i=1}^{10}|R_i|}{21} \quad (4)$$

In a similar manner, the shake remaining amounts $R_0$ to $R_{10}$ [mm] at each division position in a case where the image on the imaging face is moved in the horizontal direction by 0.1264 [mm], which is the movement amount at the division position "0.1," are calculated and the average value $R_{AV1}$ [mm] of the absolute value of these shake remaining amount is calculated using the equation (4). By using a similar calculation, the average value $R_{AV1}$ [mm] of the absolute value of the shake remaining amount corresponding to the movement amount at each division position is calculated.

Figure 4:
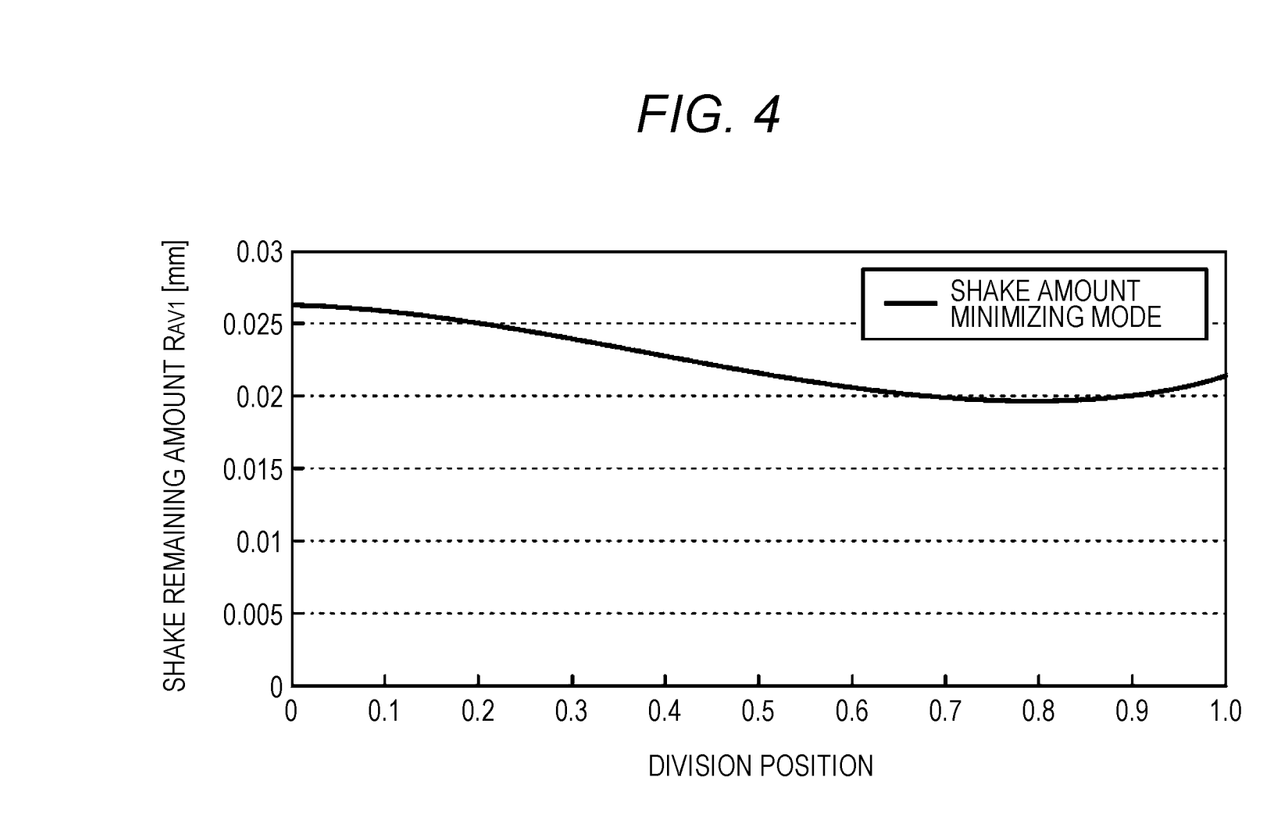
FIG. 4 is a graph illustrating an average value of an absolute value of a shake remaining amount with respect to an image movement amount.

An example of the average value $R_{AV1}$ [mm] of the absolute value of the shake remaining amount corresponding to the movement, amount at each division position in the horizontal direction calculated in this manner is illustrated in FIG. 4. In the example illustrated in FIG. 4, the average value $R_{AV1}$ of the absolute values of the shake remaining amount corresponding to the division position "0.8" is the smallest. In other words, according to the calculation algorithm of the "shake amount minimizing mode," the image stabilization lens 10 is moved in the horizontal direction by 0.1714 [mm] corresponding to the division position "0.8" and this causes that the average horizontal shake in the entire image is minimized on the imaging face.

Furthermore, as in the case of the vertical direction, the average value $R_{AV1}$ [mm] of the absolute value of the shake remaining amount corresponding to the movement amount at each division position in the vertical direction is calculated, and a vertical image movement amount to minimize the average value is calculated. As described above, by determining the movement amounts in the horizontal direction and the vertical direction, the average image shake amount at a plurality of points on the imaging face is suppressed, and the image movement amount at each point on the imaging face is suppressed overall on the imaging face.

Finally, the correction coefficient is calculated by dividing the movement amount with which the average value $R_{AV1}$ [mm] of the absolute values of the shake remaining amounts is minimum by the reference movement amount. In the example illustrated in FIGS. 3 and 4, the correction coefficient in the horizontal direction is obtained by dividing 0.1714 [mm], at which $R_{AV1}$ is minimum by 0.1257 [mm] which is the reference movement amount, is calculated as:

correction coefficient=0.1714/0.1257≈1.364. In the same manner, the correction coefficient in the vertical direction can also be obtained.

<Median Minimizing Mode>

Next, calculation of the correction coefficient in the "median minimizing mode" will be described with newly reference to FIG. 5. When the "median minimizing mode" is selected by the correction mode selection switch 6b, the image movement amount is determined so that the absolute value of the average value of the shake remaining amount in each direction is minimized and the correction coefficient is calculated based on the determined image movement amount. More specifically, first, in the example illustrated in FIG. 3, the shake remaining amounts $R_0$ to $R_{10}$ [mm] at respective division positions when the image on the imaging face is horizontally moved by 0.1257 [mm] which is the reference movement amount are calculated.

Next, an average value of each shake remaining amounts $R_0$ to $R_{10}$ is calculated. As described above, although there is one center point of the imaging face, there are two division positions "0.1" to "1" on both left and right sides, so the shake remaining amounts $R_1$ to $R_{10}$ are doubled and then an average value is calculated. The absolute value $R_{AV2}$ of the average value of the shake remaining amount, which is the absolute value of the average value, can be calculated by using the following equation.

$$R_{AV2} = \left| \frac{R_0 + 2\sum_{i=1}^{10} R_i}{21} \right| \quad (5)$$

In a same manner, the shake remaining amounts $R_0$ to $R_{10}$ [mm] at respective division positions when the image on the imaging face is moved by 0.1264 [mm] in the horizontal direction, which is the movement amount at the division position "0.1", are calculated, and an absolute value $R_{AV2}$ [mm] of the average value of these shake remaining amounts is calculated by using the equation (5). By using a similar calculation, the absolute value $R_{AV2}$ [mm] of the average value of the shake remaining amount corresponding to the movement amount at each division position as calculated.

Figure 5:
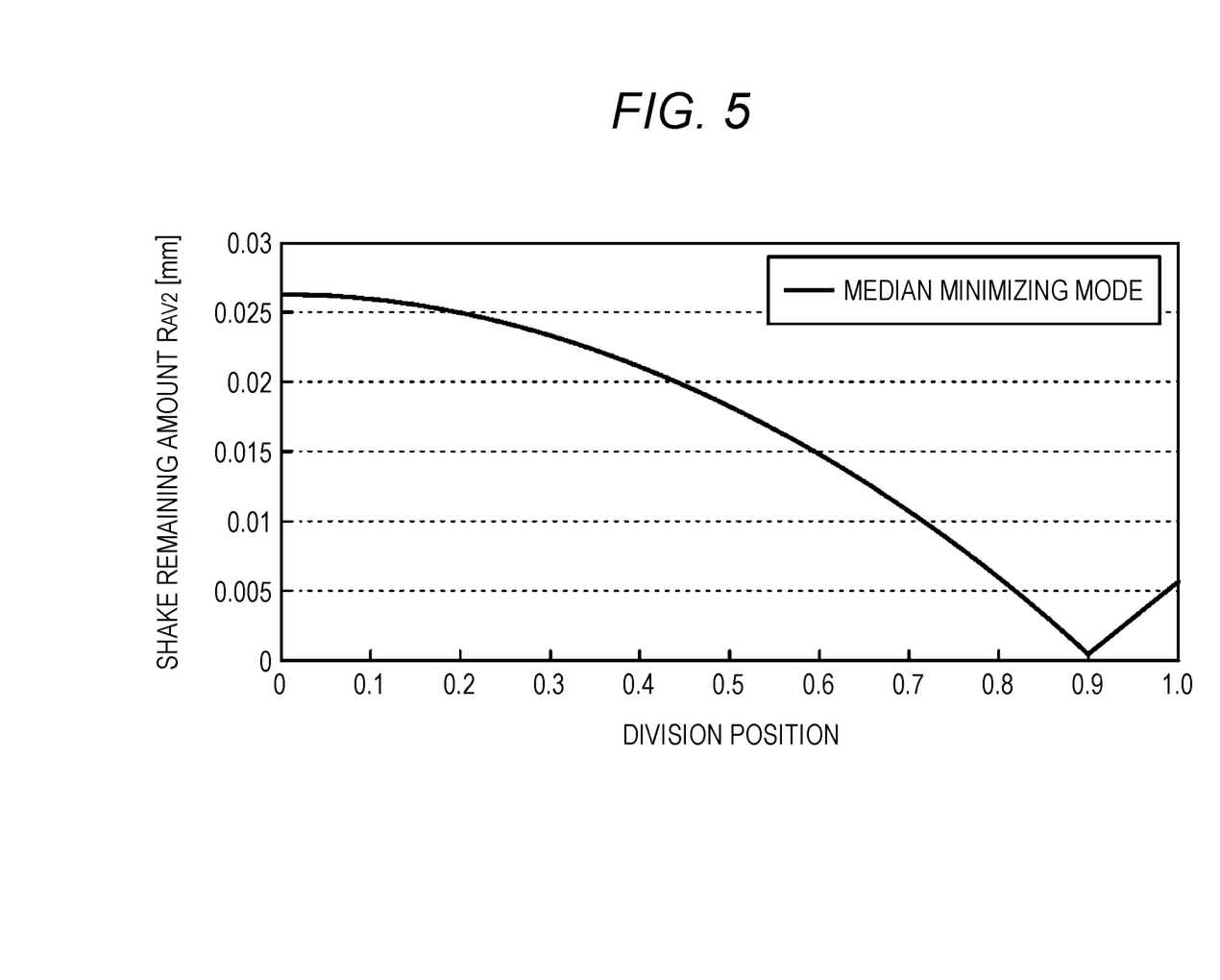
FIG. 5 is a graph illustrating the absolute value of the average value of the shake remaining amount with respect to the image movement amount.

An example of the absolute value $R_{AV2}$ [mm] of the average value of the shake remaining amount corresponding to the movement amount at each division position in the horizontal direction calculated in this manner is illustrated in FIG. 5. In the example illustrated in FIG. 5, the absolute value $R_{AV2}$ of the average value of the shake remaining amount corresponding to the division position "0.9" is the smallest. In other words, according to the calculation algorithm of the "median minimizing mode", the image stabilization lens 10 is moved in the horizontal direction by 0.1836 [mm] corresponding to the division position "0.9" and the average horizontal shake is minimized in the entire image on the imaging face. By determining the image movement amount based on this calculation algorithm, the median of the shake remaining amount of each point can be minimized, and the average image shake amount at a plurality of predetermined points on the imaging face is suppressed.

Furthermore, also in the vertical direction, the absolute value $R_{AV2}$ [mm] of the average value of the shake remaining amount corresponding to the movement amount at each division position in the vertical direction is calculated, and the image movement amount in the vertical direction is calculated so that the absolute value $R_{AV2}$ [mm] is minimized. As described above, by determining the movement amounts in the horizontal direction and the vertical direction, the average image shake amount at a plurality of points on the imaging face is suppressed, and the image movement amount at each point on the imaging face is suppressed overall on the imaging face.

Finally, the correction coefficient is calculated by dividing the movement amount at which the absolute value $R_{AV2}$ [mm] of the average value of the shake remaining amount is minimum by the reference movement amount. In the example illustrated in FIGS. 3 and 5, by dividing 0.1836 [mm] at which $R_{AV2}$ is minimum by 0.1257 [mm] which is the reference movement amount, the correction coefficient in the horizontal direction is obtained as follows.

correction coefficient=0.1836/0.1257≈1.461. In the same manner, the correction coefficient in the vertical direction can also be obtained.

<Allowable Shake Amount Range Maximizing Mode>

Next, calculation of the correction coefficient in the "allowable shake amount range maximizing mode" will be described with newly reference to FIG. 6. When the "allowable shake amount range maximizing mode" is selected by the correction mode selection switch 6b, the image movement amount is determined such that the number of points at which the shake remaining amount becomes equal to or less than a predetermined allowable shake amount is maximized, and the correction coefficient is calculated based on the image movement amount. More specifically, first, in the example illustrated in FIG. 3, the shake remaining amounts $R_0$ to $R_{10}$ [mm] at respective division positions when the image on the imaging face is horizontally moved by 0.1257 [mm] which is the reference movement amount are calculated.

Next, among the shake remaining amounts $R_0$ to $R_{10}$, a number of points whose values are equal to or less than a predetermined allowable shake amount [mm] is counted. As described above, although the center point of the imaging face is one point, since there are two division positions "0.1" to "1" on both the left and right sides, when the values of the shake remaining amounts $R_1$ to $R_{10}$ are equal to or less than predetermined allowable shake amount, the number of points is counted as "two." In the example illustrated in FIG. 6, when the image on the imaging face is moved in the horizontal direction by the reference movement amount, the number of points whose value of the shake remaining amount is equal to or less than the predetermined allowable shake amount is counted as nine.

In a similar manner, when the image on the imaging face is moved in the horizontal direction by 0.1264 [mm], which is the movement amount at the division position "0.1", the shake remaining amounts $R_0$ to $R_{10}$ [mm] at respective division positions are calculated and a number of points whose value is equal to or less than the predetermined allowable shake amount are counted. FIG. 6 illustrates an example of the number of points at which the shake remaining amount becomes equal to or less than a predetermined allowable shake amount corresponding to the movement amount at each division position in the horizontal direction calculated in this manner. In the example illustrated in FIG. 6, when the movement is made by the moving amount at the division positions "0.5" and "0.6" in the horizontal direction, the number of points for which the shake remaining amount is equal to or less than the allowable shake amount is "11," which is the maximum.

In other words, according to the calculation algorithm of the "allowable shake amount range maximizing mode," by moving the image stabilization lens 10 so as to move the image on the imaging face is moved only 0.1436 [mm] corresponding to the division position "0.5" or 0.1515 [mm] corresponding to the division position "0.6" in the horizontal direction, the number of points at which the shake remaining amount is equal to or less than the allowable shake amount is maximized. As described above, when the number of points where the shake remaining amount is equal to or less than the allowable shake amount is maximized, the number of pixels for which the shake amount is equal to or less than the allowable value can be maximized in the entire image. By determining the movement amount of the image based on this calculation algorithm, the area in which the shake amount is suppressed to the allowable value or less in the entire image can be maximized, and the average image shake amount at the plurality of predetermined points on the imaging face is suppressed. Furthermore, also in the vertical direction, similarly, the number of points at which the shake remaining amount corresponding to the movement amount at each division position in the vertical direction is equal to or less than the allowable shake amount is calculated, and an image movement amount in the vertical direction is calculated so that the number of points are maximized.

Finally, the correction coefficient is calculated by dividing the movement amount at which the number of points at which the shake remaining amount becomes equal to or less than the allowable shake amount is the maximum by the reference movement amount. In the example illustrated in FIGS. 3 and 6, by dividing 0.1436 [mm] at which the number of points which become equal to or less than the allowable shake amount is maximum by 0.1257 [mm] which is the reference movement amount, the correction coefficient in the horizontal direction is calculated as follows.

correction coefficient=0.1436/0.1257≈1.142 In the same manner, the correction coefficient in the vertical direction can also be obtained. In the example illustrated in FIG. 6, since the number of points where the shake remaining amount is equal to or less than the allowable shake amount is the same number at the division positions "0.5" and "0.6", the movement amounts corresponding to these division positions are averaged and the correction coefficient may be calculated based on this average value.

In the image stabilization device according to the embodiment of the present invention, since the movement amount of the image stabilization lens 10 is determined such that the image shake amount at each point on the imaging face of the imaging sensor 4a is suppressed overall on the imaging face, an image in which the image shake difference within the angle of view is inconspicuous and gives an impression with less image shake can be formed.

Further, in the image stabilization device according to the present embodiment, the correction amount calculation unit 16a determines a movement amount of the image stabilization lens 10 so that the average image shake amounts $R_0$ to $R_{10}$ at a plurality of predetermined points on the imaging face are suppressed. Thus, the image shake amount can be suppressed overall on the imaging face, instead of reducing the image shake amount at a specific point to substantially zero.

Furthermore, in the image stabilization device according to the present embodiment, on the imaging surface, since the plurality of division positions are set to be evenly distributed on the imaging face at equal intervals (FIG. 3), the entire shake amount in the angle of view can be reflected in the image stabilization, and the shake amount can be suppressed overall.

Further, in the image stabilization device according to the present embodiment, in the "shake amount minimizing mode", the correction amount calculation unit 16a determines the movement amount such that a value obtained by averaging absolute values of the image shake amounts at a plurality of predetermined points on the imaging face is minimized (FIG. 4). Therefore, the average amount of image shake at a plurality of points on the imaging face is suppressed, and the image shake amount at each point on the imaging face can be suppressed overall on the imaging face.

Furthermore, in the image stabilization device according to the present embodiment, in the "median minimizing mode," the correction amount calculation unit 16a determines the movement amount so that the absolute value of the average value of the image shake amount at a plurality of predetermined points on the imaging face is minimized (FIG. 5). With this configuration, the median of the shake remaining amount at each point can be minimized, and the average image shake amount at a plurality of predetermined points on the imaging face can be suppressed.

Figure 6:
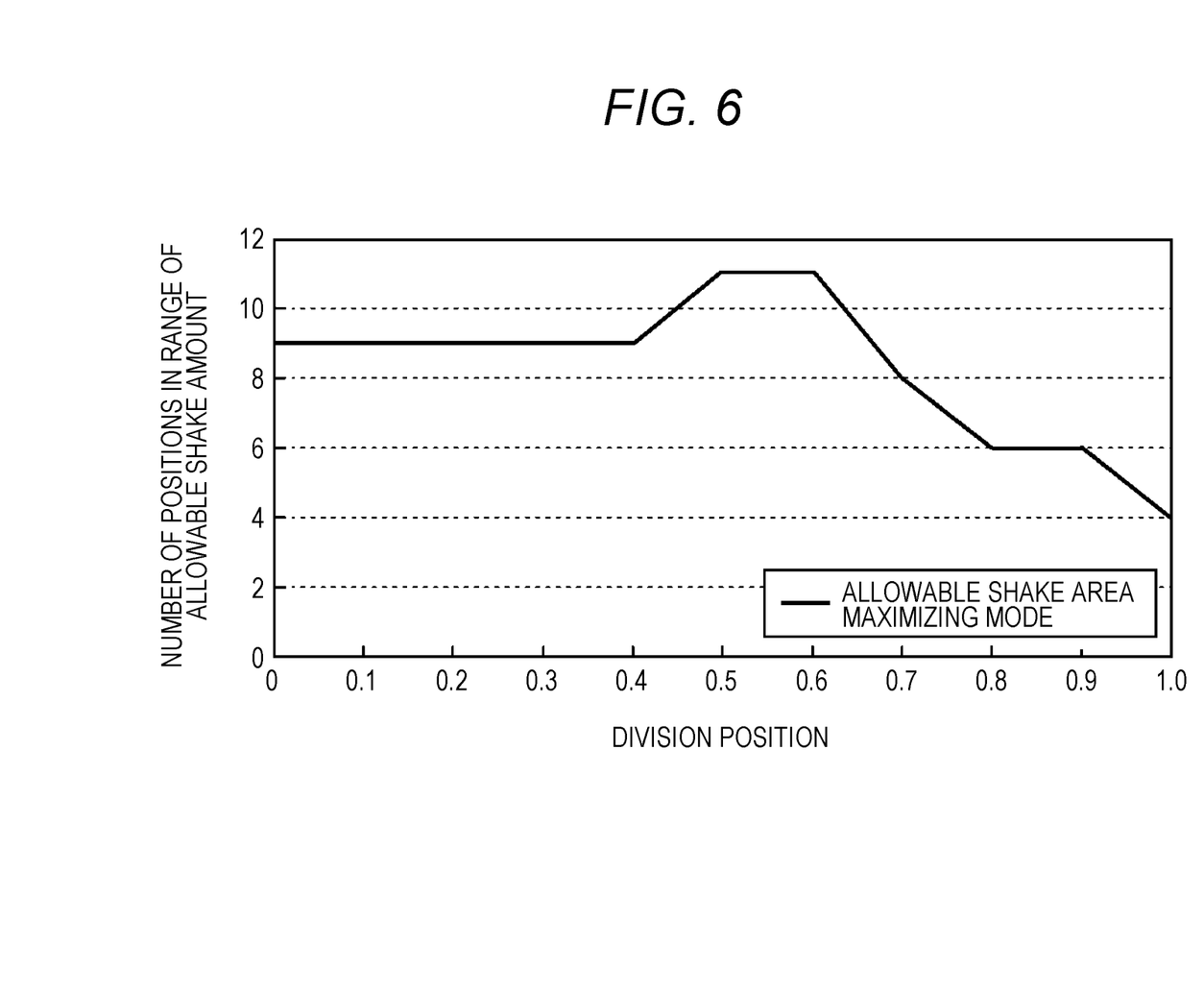
FIG. 6 is a graph illustrating a number of points where the value of the shake remaining amount with respect to the image movement amount is less than an allowable shake amount.

Further, in the image stabilization device according to the present embodiment, in the "allowable shake amount range maximizing mode," the correction amount calculation unit 16a determines the movement amount so that the area where the image shake amount is equal to or less than a predetermined allowable value on the imaging face becomes widest (FIG. 6). Therefore, in the entire image, the number of pixels whose shake amount is equal to or less than the allowable value can be maximized. As a result, the area in which the shake amount is suppressed to the allowable value or less can be maximized in the entire image, and the average image shake amount at a plurality of predetermined points on the imaging face can be suppressed.

Furthermore, in the image stabilization device according to the present embodiment, the correction amount calculation unit 16a determines the movement amount using a different calculation algorithm based on the correction mode selected by the correction mode selection switch 6b. Therefore, a correction mode suitable for user's intention of of photographing or the photographing scene can be selected.

In the above, although the embodiment of the present invention has been described, various changes can be made to the embodiment mentioned above. In particular, according to the above described embodiment, in order to suppress image shake formed on the imaging face, the image stabilization lens among the plurality of lenses is moved to move the image formed on the imaging face; however, the present invention can also be applied to an image stabilization device of a type that suppresses image shake by moving an imaging face with an actuator. According to the above described embodiment, eleven division positions are set in the vertical and horizontal directions respectively, and the shake amount is evaluated for these points; however, the number of points for evaluating the shake may be arbitrarily set and the points to be evaluated may not necessarily be set with equal intervals.

Further, according to the above described embodiment, the movement amount is determined so as to suppress the average image shake amount on the imaging face, and the correction coefficient is calculated by dividing this movement amount by the reference movement amount. However, the actuator may be controlled so that the determined movement amount is directly realized without calculating the correction coefficient. Furthermore, according to the above described embodiment, the plurality of correction modes are configured to be switchable; however, the image stabilization device may have only one correction mode.

Furthermore, according to the above-described embodiment, the present invention is applied to a lens unit (so-called zoom lens) configured to be able to change the focal length; however, the present invention is not limited to this example and the present invention can also be applied to a lens unit with a fixed focal length (so-called single focus lens). In this case, the correction coefficient may be calculated at a fixed predetermined focal length.

What is claimed is:

1. An image stabilization device for correcting an image shake formed on an imaging face of an imaging device, the image stabilization device comprising:
    a shake angle sensor configured to detect a shake angle of the imaging device;
    a correction amount calculation unit configured to set a movement amount of an image stabilization lens composing a part of an imaging optical system provided in the imaging device or a movement amount of the imaging face based on the shake angle detected by the shake angle sensor to suppress the image shake formed on the imaging face; and
    an actuator configured to move the image stabilization lens or the imaging face by the movement amount set by the correction amount calculation unit in a plane orthogonal to an optical axis of the imaging device,
    wherein the correction amount calculation unit determines the movement amount to suppress the image shake amount at each point overall on the entire imaging face, and
    wherein the correction amount calculation unit determines the movement amount to suppress average image shake amounts at a plurality of predetermined points on the imaging face.

2. The image stabilization device according to claim 1, wherein the plurality of predetermined points on the imaging face is set being almost evenly distributed on the imaging face.

3. The image stabilization device according to claim 1, wherein the correction amount calculation unit determines the movement amount to minimize a value obtained by averaging absolute values of the image shake amounts at the plurality of predetermined points on the imaging face.

4. The image stabilization device according to claim 1, wherein the correction amount calculation unit determines the movement amount to minimize an absolute value of an average value of the image shake amounts at the plurality of predetermined points on the imaging face.

5. The image stabilization device according to claim 1, wherein the correction amount calculation unit determines the movement amount so that an area in which the image shake amount becomes equal to or lower than a predetermined allowable value becomes widest on the imaging face.

6. The image stabilization device according to claim 1, further comprising a correction mode selection switch configured to select a correction mode from a plurality of correction modes that respectively determine the movement amount using different calculation algorithms,
    wherein, based on the correction mode selected by the correction mode selection switch, the correction amount calculation unit determines the movement amount by using a calculation algorithm corresponding to the selected correction mode.

7. A lens unit including the image stabilization device according to claim 1, the lens unit comprising:
    a lens barrel; and
    an imaging lens provided inside the lens barrel,
    wherein the actuator is configured to drive the image stabilization lens among the imaging lenses in a plane orthogonal to an optical axis.

8. An imaging device including the image stabilization device according to claim 1, the imaging device comprising:
    an imaging device body; and
    an imaging sensor provided inside the imaging device body and having the imaging face,
    wherein the actuator is configured to drive the imaging sensor in a plane orthogonal to an optical axis.

9. An image stabilization method for correcting an image shake formed on an imaging face of an imaging device, the method comprising:
    detecting a shake angle of the imaging device;
    setting a movement amount of the an image stabilization lens composing a part of an imaging optical system provided in the imaging device or a movement amount of the imaging face based on the detected shake angle so that the image shake formed on the imaging face is suppressed based; and
    moving the image stabilization lens or the imaging face by the set movement amount in a plane orthogonal to an optical axis of the imaging device,
    wherein, in setting movement amount, the movement amount is determined to suppress the image shake amount at each point overall on the imaging face, and
    wherein the movement amount is determined so as to suppress average image shake amounts at a plurality of predetermined points on the imaging face.

* * * * *